Dec. 23, 1941.   A. W. BIDDLECOMB ET AL   2,267,321
EDIBLE NUT CLEANING AND POLISHING MACHINE
Filed Aug. 4, 1940

INVENTORS.
ALBERT W. BIDDLECOMB
MILTON H. BIDDLECOMB
EDWIN G. BIDDLECOMB
ERNEST BIDDLECOMB
BY James M. Abbett ATTY.

Patented Dec. 23, 1941

2,267,321

UNITED STATES PATENT OFFICE 2,267,321

EDIBLE NUT CLEANING AND POLISHING MACHINE

Albert W. Biddlecomb, Milton H. Biddlecomb, Edwin G. Biddlecomb, and Ernest Biddlecomb, Los Angeles, Calif.

Application August 4, 1940, Serial No. 351,316

2 Claims. (Cl. 146—202)

This invention relates to the processing of products and particularly pertains to an edible nut cleaning and polishing machine.

When various kinds of edible nuts are placed on the market food regulations require that they shall be cleaned to a certain standard, and that in the case of English walnuts and other nuts of that variety they shall be properly polished. This prevents the nuts from deteriorating in storage and also makes it possible for nuts to be properly cleaned and reconditioned after they have been in necessary storage. It is the principal object of the present invention, therefore, to provide a structure through which nuts may be passed and within which they may be thoroughly cleaned and polished by a rapid automatic operation, whereby a product of high quality is obtained to meet inspection requirements.

The present invention contemplates the provision of a hopper in which nuts may be placed and from which they feed by gravity, said hopper delivering the nuts to brushes which act to turn and thoroughly brush and scour the entire surface of the nuts, after which the nuts pass through an air zone where they are subjected to a stream of air which will rid them of any loose particles of extraneous material which should be removed.

The invention is illustrated by way of example in the accompanying drawing, in which.

Figure 1:
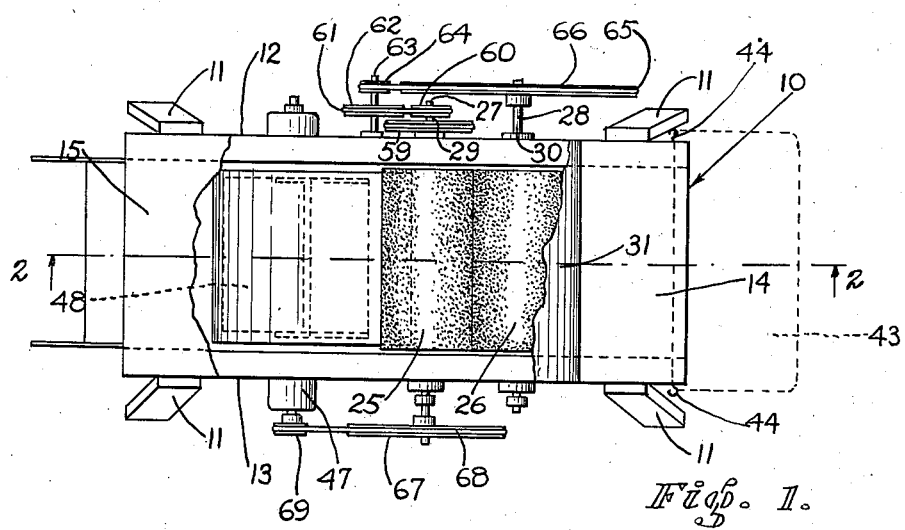
Figure 1 is a view in plan showing the machine with which the present invention is concerned and the relation of the brushes and the blower with the hopper removed.
Figure 2:
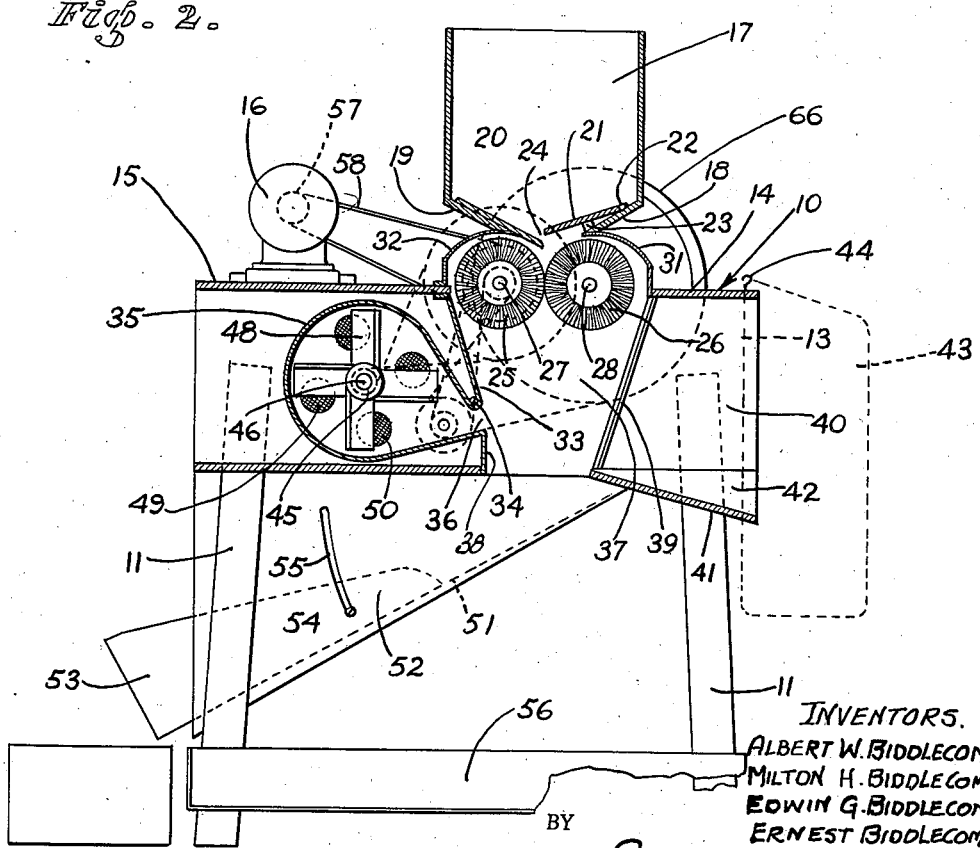
Fig. 2 is a view in central vertical section through the machine as seen on the line 2—2 of Fig. 1.

Referring more particularly to the drawing, 10 indicates a base frame which is substantially rectangular in plan and is mounted upon supporting legs 11. It is understood that while a particular form of sub structure is shown in the drawing for the support of the apparatus that various changes might be made without departing from the spirit of the invention. It is desirable, however, to provide a device which is sufficiently small and light enough in weight so that it may be easily carried from place to place where operations are required. The base frame is formed with side panels 12 and 13 which are spaced from each other. A top panel 14 is secured across the space to secure the side panels together at one end of the machine and a top panel 15 is similarly secured at the opposite end of the machine. The panel 15 provides a support for a driving motor 16. Suitably secured above the base structure 10 is a hopper 17 into which articles to be cleaned may be deposited in bulk. The bottom of this hopper is formed with downwardly inclined floor members 18 and 19 which form a throat through which the articles to be cleaned may gravitate. Mounted upon these floor members are adjustable bottom plates 20 and 21. These are held in position by screws 22 which pass through longitudinally extending slots and make it possible for the plates to be moved toward and away from each other. A lug 23 is carried on the floor member 18 and tends to dispose the bottom plate 21 at a slightly different angle than the bottom plate 20. These plates are adjusted with relation to each other to form a throat 24 with the lower edge of the plate 21 at a higher elevation than the lower edge of the plate 20. This causes the nuts to pass outwardly in controlled flow. Disposed directly beneath the hopper and at opposite sides of the vertical median line thereof are a pair of rotary brushes 25 and 26. These brushes are mounted upon shafts 27 and 28. The shaft 27 may be disposed on a lower plane than the shaft 28, thus the brush 26 would be positioned closer to the throat 24 of the hopper. The shafts 27 and 28 are journaled in bearings 29 and 30 which are carried upon the vertical panels 12 and 13 of the frame structure. These shafts are spaced sufficiently close together to cause the outer circumferences of the brushes to mesh as they rotate in counter direction to each other. The brush 26 rotates counter-clockwise and the brush 25 rotates clockwise so that the nuts will be drawn downwardly between the brushes. The bristles will move to accommodate the nuts and will brush and scour them as the nuts are fed between the brushes. As will be hereinafter described, the two brushes revolve at different rates of speed so that there will be an increased brushing action.

A hood 31 is mounted over the rear portion of the brush 26 and fits beneath the hopper floor section 18. This tends to support the hopper. A hood section 32 is secured beneath the hopper floor section 20 and fastened to the base 10 at the rear side of the brush 25. Forming a continuation of the hood 32 is an inclined wall member 33 which extends downwardly and is hinged at 34. Thus it is possible to swing the wall member 33 away from the brush 25 so that it may be cleaned. Adjacent to the wall member 33 and disposed between the panels 12 and 13 of the base is a substantially cylindrical blower housing 35. This blower housing has tangential wall continuations which form an air throat 36. This throat directs air horizontally and slightly upwardly across the main throat 37 which occurs beneath the brushes 25 and 26 and is defined by the member 33, a wall 38 and a substantially vertical screen 39. The screen 39 is slightly inclined from the vertical toward its upper end. This upper end terminates adjacent to the back of the circumference of the brush 26.

An air passageway 40 is formed between the two side panels 12 and 13 of the base. The top of this passageway is covered by the panel 14 and the bottom of the passageway is defined by an outwardly and downwardly inclined floor panel 41. Side members 42 seal in the space between the panel 41 and the lower edges of the side panels 12 and 13. Disposed over the outer opened end of the duct 40 is a dust-bag 43 which may be held in place upon hooks 44. This dust-bag receives the air after it has passed through the stream of nuts, and while it permits the air to escape will entrap the dust and larger particles of material which have become entrained in the air.

Mounted in the blower housing 35 is a rotor 45 carried on a shaft 46. The shaft is journaled in bearings 47 on the base panels 12 and 13. A plurality of radially disposed rotor blades 48 form a part of the rotor and impel air through the blower throat 36 and into the cleaning throat 37. Openings 49 are formed through the end panels and communicate with the blower housing 35 so that air may be drawn into the blower structure as the impeller blades move. It is desirable to cover these openings with foraminous material, as indicated at 50. Extending downwardly and oppositely from beneath the floor member 41 of the duct 40 is an inclined screen 51. This screen is positioned between two side wall members 52 and receives the nuts as they fall downwardly through the throat 37. Mounted above the screen and free to swing vertically is an adjustable chute section 53 which may be held in position by adjusting screws 54 in a slot 55. The outer end of the chute section 53 extends between the supporting legs 11 and beyond the end of the base structure 10. At this point the nuts may be discharged into a receiving receptacle. Supported beneath the base structure 10 and carried between the sets of legs 11 is a dust-box 56 within which dust may accumulate as it falls through the inclined screen 51.

The device is driven from the motor 16 which is mounted on the base 10. This motor is fitted with a driving pulley 57 around which a belt or chain 58 passes. The belt 58 is led around a pulley 59 which is carried on the end of the shaft 27 and upon which shaft the brush 25 is mounted. The shaft 27 also carries a relatively small pulley 60 which is provided with a crossed belt 61 leading around a pulley 62 on a jack shaft 63. A relatively small pulley 64 is mounted on this jack shaft while a belt 65 is led around it and also around a relatively large pulley 66 which is mounted upon the shaft 28 of the brush 26. At the opposite end of shaft 27 from pulley 59 is a pulley 67 which receives a belt 68. This belt is led around a pulley 69 and is crossed to reverse the direction of rotation. The pulley 69 is mounted upon the shaft 46 of the blower rotor 45.

In operation of the present invention nuts to be cleaned are placed in the hopper 17. The motor 16 is driven. This will drive the shaft 27 and will drive the brush 25 in a clockwise direction. Due to the ratio between the pulleys on the shaft 27, the pulleys on the jack shaft 63 and the pulley 66 on the shaft 28, the brush 25 will be driven at a relatively high speed as compared with the speed of rotation of the brush 26. The brush 26 will thus tend to retard the nuts which pass downwardly through the throat 24 so that as the brush 25 moves there will be a tendency for the nuts to rotate and be brushed and polished. During this operation the blower rotor 45 will be rotating in a counter-clockwise direction to force a stream of air through the throat 36 and across the throat 37 beneath the brushes. As the nuts fall they will encounter this stream of air so that material upon them will blow out. The finer material will be carried with the air through the screen 39 and into the air duct 40 from which it will pass into the dust-bag 43. The nuts then fall onto the inclined screen 51 along which they will roll by gravity, thereafter passing along the adjustable chute 53 and into a receptacle. Any dirt or loose material which clings to the nuts after they have passed through the stream of air and throat 37 will be loosened as the nuts fall onto the screen 51. This material will then pass through the screen and fall into the dust-box 56.

It will thus be seen that by the construction and arrangement here disclosed a portable machine is provided for cleaning and polishing nuts, which is decidedly simple in its construction and operates directly to rotate and brush the nuts and to separate extraneous material from them pneumatically.

While we have shown the preferred form of our invention as now known to us, it will be understood that various changes may be made in combination, construction and arrangement of parts by those skilled in the art, without departing from the spirit of our invention as claimed.

Having thus described our invention, what we claim and desire to secure by Letters Patent is:

1. A device of the character described comprising a hopper having an outlet throat in its bottom wall, means for adjusting the width of said throat whereby the flow of nuts from the hopper may be controlled, a pair of cylindrical rotary brushes mounted on horizontal axes and contacting with each other along the vertical plane of the hopper throat whereby nuts falling from the hopper will drop into the throat formed by the two brushes, means for driving the two brushes in opposite directions and at different speeds whereby the nuts will be fed downwardly between the brushes and may thereafter fall by gravity, an inclined chute having a foraminous floor and being disposed to receive the nuts, a blower, a discharge opening therefrom projecting a stream of air across the path of the nuts as they fall from the brushes, a screen disposed at the opposite side of said path and through which air from the blower may pass, and a dust-bag into which the air passes and where dust is separated from the air.

2. A device of the character described comprising a hopper having an outlet throat in its bottom wall, means for adjusting the width of said throat whereby the flow of nuts from the hopper may be controlled, a pair of cylindrical rotary brushes mounted on horizontal axes and contacting with each other along the vertical plane of the hopper throat whereby nuts falling from the hopper will drop into the throat formed by the two brushes, means for driving the two brushes in opposite directions and at different speeds whereby the nuts will be fed downwardly between the brushes and may thereafter fall by gravity, an inclined chute having a foraminous floor and being disposed to receive the nuts, a blower, a discharge opening therefrom projecting a stream of air across the path of the nuts as they fall from the brushes, a screen disposed at the opposite side of said path and through which air from the blower may pass, a dust-bag into which the air passes and where dust is separated from the air, and a dust-box disposed below the inclined chute to receive dust and loose material separated from the nuts.

ALBERT W. BIDDLECOMB.
MILTON H. BIDDLECOMB.
EDWIN G. BIDDLECOMB.
ERNEST BIDDLECOMB.